United States Patent
Miyazawa

(10) Patent No.: US 8,472,061 B2
(45) Date of Patent: Jun. 25, 2013

(54) SERVER APPARATUS, CLIENT APPARATUS, CONTROL METHOD OF SERVER APPARATUS, CONTROL METHOD OF CLIENT APPARATUS, AND PROGRAM

(75) Inventor: Hiroyasu Miyazawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 334 days.

(21) Appl. No.: 12/999,057

(22) PCT Filed: Sep. 29, 2010

(86) PCT No.: PCT/JP2010/005852
§ 371 (c)(1),
(2), (4) Date: Dec. 14, 2010

(87) PCT Pub. No.: WO2011/043036
PCT Pub. Date: Apr. 14, 2011

(65) Prior Publication Data
US 2011/0228319 A1    Sep. 22, 2011

(30) Foreign Application Priority Data
Oct. 5, 2009   (JP) ................................ 2009-231433

(51) Int. Cl.
*G06F 15/00*   (2006.01)
(52) U.S. Cl.
USPC ...................................... 358/1.15
(58) Field of Classification Search
USPC ...................................... 358/1.15
See application file for complete search history.

(56) References Cited

U.S. PATENT DOCUMENTS

| 7,359,076 B2 | 4/2008 | Uchino |
| 2006/0165459 A1 * | 7/2006 | Ishii ................................ 400/62 |
| 2010/0241873 A1 | 9/2010 | Miyazawa |

FOREIGN PATENT DOCUMENTS

| JP | 2003-122513 | 4/2003 |
| JP | 2004-102695 | 4/2004 |
| JP | 2004-310758 | 11/2004 |
| JP | 2005-275910 | 10/2005 |
| JP | 2008-137214 | 6/2008 |
| JP | 2008-186270 | 8/2008 |

OTHER PUBLICATIONS

International Search Report dated Dec. 14, 2010 issued during prosecution of International application No. PCT/JP2010/005852.

* cited by examiner

*Primary Examiner* — Saeid Ebrahimi Dehkordy
(74) *Attorney, Agent, or Firm* — Fitzpatrick, Cella, Harper & Scinto

(57) ABSTRACT

A server apparatus is disclosed which communicates with a client apparatus and an image forming apparatus. The server apparatus executes a print service to transmit print data to the image forming apparatus and allows the image forming apparatus to print the print data in accordance with a print request transmitted from the client apparatus. The server apparatus then transmits a processing situation of the executed print service in accordance with a request repeatedly transmitted from the client apparatus. The server apparatus finally stops the request repeatedly transmitted from the client apparatus in response to completion of a process corresponding to the print request in the executed print service.

5 Claims, 15 Drawing Sheets

FIG. 2A

| user_id | user_name |
|---|---|
| u00001 | Name01 |
| u00002 | Name02 |
| ... | ... |

FIG. 2B

| mf_id | local_address | ext_address | subnet |
|---|---|---|---|
| mf_0001 | 192.168.10.20 | xxx.xxx.127.10 | 192.168.10.0/24 |

FIG. 2C

| user_id | allow_device |
|---|---|
| u00001 | d0001,d0002,d0003 |
| u00002 | d0001,d0002 |
| ... | ... |
| u00010 | d0010 |

FIG. 2D

| device_id | mf_id | local_address | ext_address | subnet |
|---|---|---|---|---|
| d0001 | mf_0001 | 192.168.10.20 | xxx.xxx.127.10 | 192.168.10.0/24 |
| d0002 | mf_0002 | 192.168.1.10 | xxx.xxx.127.11 | 192.168.1.0/24 |
| d0003 | mf_0002 | 192.168.20.10 | xxx.xxx.127.10 | 192.168.20.0/24 |

FIG. 2E

| mf_id | driver |
|---|---|
| mf_0001 | driver_A |
| mf_0002 | driver_B |
| mf_0003 | driver_C |

FIG. 5

```
<soap:Envelope
    xmlns:soap="http://www.w3.org/2003/05/soap-envelope"
    xmlns:xmlmime="http://www.w3.org/2004/11/xmlmime"       ⎫
    xmlns:xop="http://www.w3.org/2004/08/xop/include">      ⎬ 501
    soap:encodingStyle='http://www.w3.org/2002/12/soap-encoding' >
  <soap:Header>
    <To>uuid:DeviceUUID</To>  ─ 502
    <LocalAddress>192.168.10.10</LocalAddress>  ─ 503
    <ReturnServerAddress>http://idofserver/return</ReturnServerAddress>  ─ 504
    <Action>
    http://localaddress:8080/PrintDocumentWS  ─ 505
    </Action>
    <UserId>u0001</UserId>  ─ 506
  </soap:Header>
  <soap:Body>
    <SendDocumentRequest>
      <JobId>000000000000001</JobId>  ─ 507
      <DocumentDescription>
        <DocumentId>1</DocumentId>  ─ 508
        <Format>application/octet-stream</Format>  ─ 509
        <DocumentName>Example.pdf</DocumentName>  ─ 510
      </DocumentDescription>
      <DocumentData xmlmime:content-type="application/octet-stream">  ─ 511
        <xop:Include href="cid:000001" />  ─ 512
      </DocumentData>
    </SendDocumentRequest>
  </soap:Body>
</soap:Envelope>

Content-Type: application/octet-stream;
Content-Transfer-Encoding: binary
Content-ID: <000001>                    ─ 513
  <BINARY DATA> Document PDL Data --PDL Data --  ─ 514
```

SERVER APPARATUS, CLIENT APPARATUS, CONTROL METHOD OF SERVER APPARATUS, CONTROL METHOD OF CLIENT APPARATUS, AND PROGRAM

This application is a National Stage application under 35 U.S.C. §371 of International Application No. PCT/JP2010/005852, filed on Sep. 29, 2010, which claims priority to Japanese Application No. 2009-231433, filed on Oct. 5, 2009, the contents of each of the foregoing applications being incorporated by reference herein.

TECHNICAL FIELD

The present invention relates to a server apparatus, a client apparatus, a control method of the server apparatus, a control method of the client apparatus, and a program.

BACKGROUND ART

In recent years, a document management system using an Internet technique has been spread. In the document management system, the user can access a Web opened by a server computer from a client computer through the Internet, select a document on the Web, display it to display means, and browse an image. Moreover, the user can also freely print the browsed image by the client computer. Such an operation results in invasion of a copyright of contents and becomes a problem, particularly, in toll contents. To avoid such a problem, a technique having a purpose of restricting the printing of the contents on the client computer side has been proposed (for example, refer to Japanese Patent Application Laid-Open No. 2004-102695).

According to the technique disclosed in Japanese Patent Application Laid-Open No. 2004-102695, first, from printer information corresponding to a user ID peculiar to each user, a printer driver which coincides with the printer information is extracted. Print data of detailed information of headline items is formed by using the printer driver and transmitted to a client computer. By using such a method, contents is provided only to the user whom browsing use has been permitted.

In recent years, use of techniques such as cloud computing system and SaaS (Software as a Service) has been started. There is such a demand that owing to those techniques, application programs are installed to a server computer on the Internet side and the number of application programs which are installed to the client computer side is reduced as much as possible.

According to the technique disclosed in Japanese Patent Application Laid-Open No. 2004-102695, it is an object to suppress the printing which is executed by the user and user information and printer information are managed as profile information in a one-to-one correspondence manner. Therefore, when the user tries to print from another client computer, if a type of such a client computer differs, there is a fear of occurrence of such an inconvenience that the printing cannot be normally performed or the like. As for a connection of the client computer to the Internet, a firewall is not presumed. That is, in a network environment which is protected by the firewall, direct communication from the server computer to the printer is undesirable from a viewpoint of security and is difficult. It is, therefore, difficult that an execution result of the printing is confirmed from the server computer to the printer beyond the firewall. It is necessary to install a driver of an image forming apparatus to the client computer side. Therefore, the client computer in which many application programs have inherently been installed is further burdened.

SUMMARY OF INVENTION

Technical Problem

As mentioned above, in the related arts, there is such a problem that in a distributed print system environment, a mechanism for managing a proper print situation in the client computer is insufficient.

Solution to Problem

In order to solve the above problem, the present invention provides a server apparatus which communicates with a client apparatus and an image forming apparatus, the server apparatus comprising: execution means for executing a print service to transmit print data to the image forming apparatus and allowing the image forming apparatus to print the print data in accordance with a print request transmitted from the client apparatus; transmission means for transmitting a processing situation of the print service executed by the execution means in accordance with a request repeatedly transmitted from the client apparatus; and client control means for stopping the request repeatedly transmitted from the client apparatus in response to completion of a process corresponding to the print request in the print service executed by the execution means.

Advantageous Effects of Invention

In an environment in which the server computer exists at a location beyond the firewall, even if the driver of the image forming apparatus is not installed in the client computer, a desirable printing process can be executed.

Further features of the present invention will become apparent from the following description of exemplary embodiments with reference to the attached drawings.

BRIEF DESCRIPTION OF DRAWINGS

FIG. 1 is a whole constructional diagram of a print system of the invention.
[FIG. 2A]
FIG. 2A is a diagram illustrating example of a data format which is used in the print system.
[FIG. 2B]
FIG. 2B is a diagram illustrating example of a data format which is used in the print system.
[FIG. 2C]
FIG. 2C is a diagram illustrating example of a data format which is used in the print system.
[FIG. 2D]
FIG. 2D is a diagram illustrating example of a data format which is used in the print system.
[FIG. 2E]
FIG. 2E is a diagram illustrating example of a data format which is used in the print system.
FIG. 3 is a flowchart illustrating a procedure for registering information into a server computer 102.
FIG. 4 is a flowchart illustrating an outline of a print processing procedure in the print system.

[FIG. 5]

FIG. 5 is a diagram illustrating an example of print data which is used in the print system.

FIG. 6 is a flowchart illustrating a procedure for a print data forming process.

FIG. 7 is a flowchart illustrating a procedure for a transmitting process of the print data.

FIG. 8 is a flowchart illustrating a procedure for a transferring process of the print data.

FIG. 9 is a flowchart illustrating a procedure for a printing process.

FIG. 10 is a flowchart illustrating a procedure for a print result confirming process.

FIG. 11 is a flowchart illustrating a procedure for a print completion notification receiving process.

FIG. 12 is a flowchart illustrating a print result confirming process in the second embodiment.

FIG. 13 is a flowchart illustrating a procedure for an error process.

FIG. 14 is a flowchart illustrating a printing process in the third embodiment.

FIG. 15 is a diagram illustrating a software construction in the server computer 102.

DESCRIPTION OF EMBODIMENTS

Exemplary embodiments of the invention will be described in detail hereinbelow with reference to the accompanying drawings.

[First Embodiment]

Figure 1:
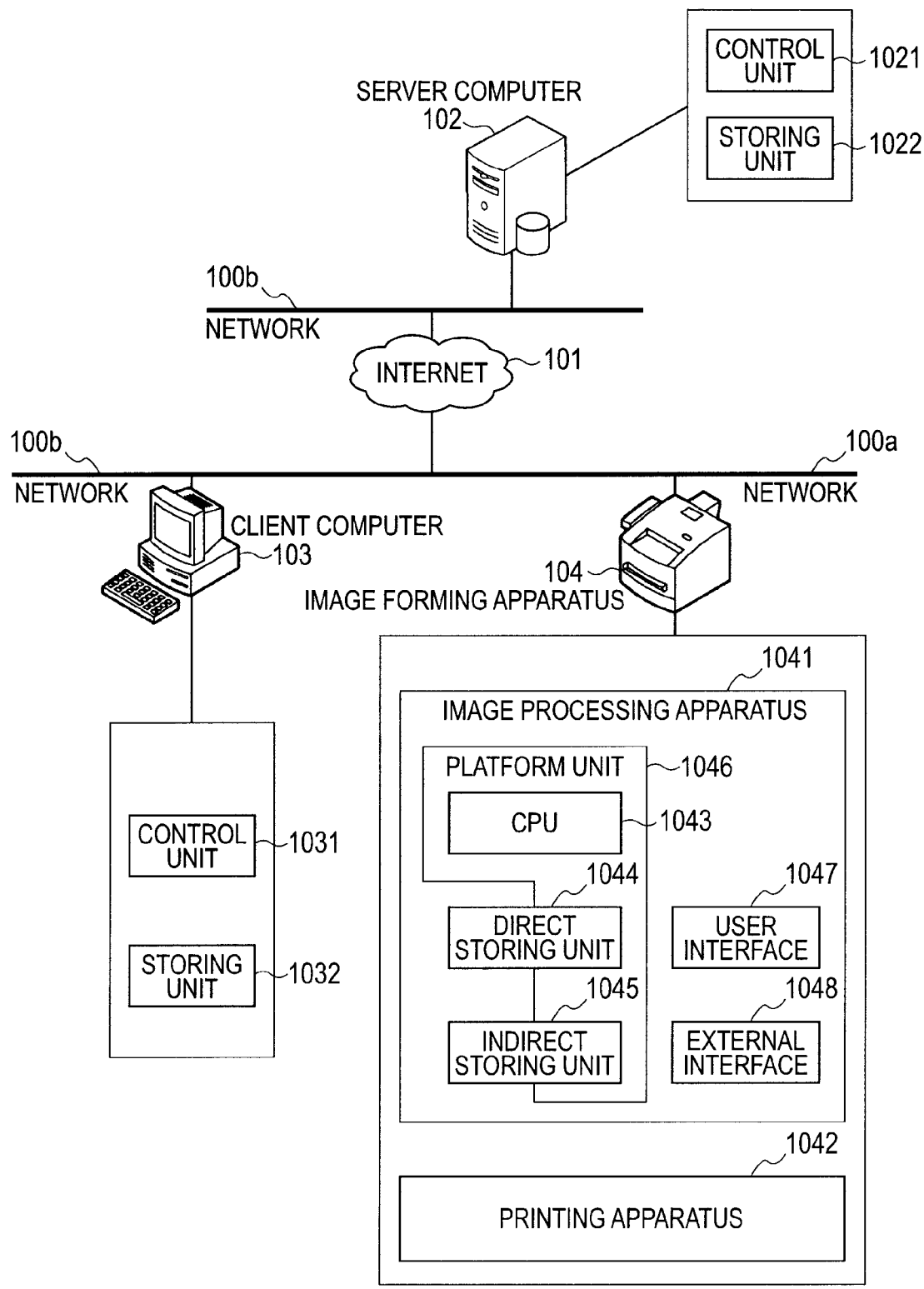
[FIG. 1]

FIG. 1 is a schematic constructional diagram of a print system according to the first embodiment. The print system is constructed by including a server computer (server apparatus) 102 serving as a print control apparatus, a client computer (client apparatus) 103, and an image forming apparatus 104. The client computer 103 and the image forming apparatus 104 exist in a same network 100a and are connected to the server computer 102 in a network 100b beyond a firewall through an Internet 101. The networks 100a and 100b act as communication lines for transmitting and receiving information among those apparatuses. The Internet 101 acts as a communication line for transmitting and receiving information between the networks 100a and 100b beyond the firewall. The network 100b to which the server computer 102 belongs and the network 100a to which the client computer 103 and the image forming apparatus 104 belong can communicate beyond the firewall through the Internet 101. The networks 100a and 100b and the Internet 101 are a communication line network for supporting, for example, a TCP/IP protocol or the like and each of them may be either a wire line or a radio line. Although only one client computer 103 and one image forming apparatus 104 have been illustrated in FIG. 1, a construction including a plurality of client computers and image forming apparatuses may be used.

The server computer 102 has a control unit 1021 and a storing unit 1022. Each of the control unit 1021 and the storing unit 1022 plays a general well-known role as a server computer. For example, an operating system and a driver for printing by the image forming apparatus 104 are installed into the storing unit 1022 and they are executed by the control unit 1021. Various kinds of print data and the like are also temporarily stored into the storing unit 1022. Further, the control unit 1021 can execute a part of each process of the embodiment and flowcharts, which will be described hereinafter. For example, the control unit 1021 registers and manages obtained information regarding the image forming apparatus 104 every user and every subnetwork and forms the print data based on the information regarding the image forming apparatus. The control unit 1021 transmits the print data to the client computer 103 and detects whether or not a print completion notification from the image forming apparatus 104 has been received. If it is detected that the print completion notification from the image forming apparatus 104 has been received, the control unit 1021 deletes the print data which was temporarily stored in the storing unit 1022 and whose printing process had been completed in the image forming apparatus 104. The control unit 1021 detects whether or not the print data whose printing process has been completed in the image forming apparatus 104 exists in the storing unit 1022. If it is determined that the print data whose printing process has been completed does not exist in the storing unit 1022, the control unit 1021 generates a notification for allowing the client computer 103 to finish the transmission of a print result confirming command to the client computer 103. Further, it is also possible to construct in such a manner that when it is determined that the printing process has failed in the image forming apparatus 104, the control unit 1021 forms information (alternative image forming apparatus information) of another image forming apparatus to which the printing process can be alternated. The control unit 1021 receives print instruction information from the client computer 103 and executes a predetermined process. The above operations will be described in detail hereinafter.

The client computer 103 has a control unit 1031 and a storing unit 1032. Each of the control unit 1031 and the storing unit 1032 plays a general well-known role as a client computer. For example, an operating system and application programs such as a Web browser are installed into the storing unit 1032 and they are executed by the control unit 1031. Further, the control unit 1031 can execute a part of each process of the embodiment and flowcharts, which will be described hereinafter. For example, the control unit 1031 receives the print data transmitted from the server computer 102 and transfers to the image forming apparatus 104. The control unit 1031 also transmits the print result confirming command for confirming whether or not the printing process of the print data has been completed to the server computer 102. Details will be described hereinafter.

The image forming apparatus 104 has an image processing apparatus 1041 for executing various kinds of image processes and a printing apparatus 1042 for executing the printing. The image processing apparatus 1041 has a CPU 1043, a direct storing unit 1044 (RAM or the like), an indirect storing unit 1045 (ROM, HDD, or the like), a user interface 1047, and an external interface 1048.

The direct storing unit 1044 is a storing unit for directly transmitting and receiving data to/from the CPU 1043. The indirect storing unit 1045 is a storing unit for transmitting and receiving data to/from the CPU 1043 through the direct storing unit 1044. Various kinds of application programs and a platform program have been stored in the direct storing unit 1044. The user interface 1047 is constructed by a keyboard, a mouse, a display, and the like, receives instructions from the user, and can display the data (image data). The external interface 1048 can receive data from an external apparatus and transmit data to the external apparatus. As an external apparatus, for example, an externally attached storing device such as externally attached HDD, externally attached USB memory, or the like or an apparatus such as host computer, image forming apparatus, or the like connected through the network is considered.

The CPU 1043 can move (store) the platform program stored in the indirect storing unit 1045 to the direct storing unit 1044. After completion of the movement, the apparatus enters a state where the CPU 1043 can execute the platform program. In the embodiment, a combination of the following constructions is called a platform unit 1046.

CPU 1043

In the direct storing unit 1044, an area where the platform program has been stored.

Areas (in the direct storing unit 1044 and the indirect storing unit 1045) for storing information (calculation results and the like) which are obtained when the CPU 1043 has processed the platform program.

The platform unit 1046 can move (store) the application programs stored in the indirect storing unit 1045 to the direct storing unit 1044. After completion of the movement, the apparatus enters a state where the platform unit 1046 can execute the application programs. Further, the platform unit 1046 can execute a part of each process of the embodiment and flowcharts, which will be described hereinafter. For example, the platform unit 1046 sends the print data to the printing apparatus 1042 and allows it to execute the printing. After completion of the printing process in the printing apparatus 1042, the platform unit 1046 generates a notification of the completion of the printing to the server computer 102. Further, the platform unit 1046 receives the print data transferred from the client computer 103 and sets only the user of the client computer 103 which transferred the print data into a print-possible state. Details will be described hereinafter.

Subsequently, examples of data formats which are used in the print system according to the embodiment will be described. FIGS. 2A to 2E are diagrams illustrating the examples of the data formats which are used in the print system according to the first embodiment. Each data format shown here is an example of the data which is registered in the server computer 102 and which relates to the image forming apparatus 104.

FIG. 2A is an example of a data structure of user information in the image forming apparatus 104. A user ID 3011 is data to specify each user (user_id). A user name 3012 is data showing a user name (user_name). A plurality of user IDs 3011 and a plurality of user names 3012 can be held. They are stored in the indirect storing unit 1045 of the image forming apparatus 104. They are read out by the platform unit 1046 and used to specify the user or the like. In the example of FIG. 2A, two kinds of data of data in which the user ID 3011 is equal to "u00001" and the user name 3012 is equal to "Name01" and data in which the user ID 3011 is equal to "u00002" and the user name 3012 is equal to "Name02" are shown. The user ID 3011 is used in common in the whole print system.

FIG. 2B is an example of a data structure of image forming apparatus specific information in the image forming apparatus 104. An apparatus type ID 3021 is data to specify a type of image forming apparatus 104 (mf_id). An IP address 3022 is a local IP address of the image forming apparatus 104 in the network 100a (local_address). An external IP address 3023 is an external IP address which is used when the image forming apparatus 104 communicates with the server computer 102 beyond the firewall through the Internet 101 (ext_address). A subnet address 3024 is a subnet address of the network 100a to which the image forming apparatus 104 belongs (subnet). In the example of FIG. 2B, the apparatus type ID 3021 to specify the type of image forming apparatus 104 is equal to "mf_0001" and the local IP address 3022 of the image forming apparatus 104 is equal to "192.168.10.20". Data in which the external IP address 3023 of the image forming apparatus 104 is equal to "xxx.xxx 0.127.10" and the subnet address 3024 of the network 100a to which the image forming apparatus 104 belongs is equal to "192.168.10.0/24" is shown.

FIG. 2C is an example of an access permission data structure of the user to the image forming apparatus 104. This data is stored in the storing unit 1022 of the server computer 102. A user ID 3031 is a user ID which is used in common in the image forming apparatus 104 and the present system (user_id). The user ID 3031 is the same as the user ID 3011. An apparatus ID 3032 is an apparatus ID to identify the image forming apparatus 104 which can be used by the user who possesses the user ID 3031 (allow_device). A plurality of apparatus IDs 3032 can exist for one user ID. Details of the apparatus ID 3032 will be described hereinafter. In the example of FIG. 2C, data in which the user ID 3031 is equal to "u00001" and the apparatus IDs 3032 of the image forming apparatuses 104 which can be used are equal to "d0001, d0002, d0003" has one data construction. Subsequently, an example in which the apparatus IDs 3032 of the image forming apparatuses 104 which can be used with respect to each data below data in which the user ID 3031 is equal to "u00002" is illustrated. Thus, the user can use a plurality of image forming apparatuses 104 and the user is not limited to use from the specific client computer 103.

FIG. 2D is an example of a data structure for managing the image forming apparatus specific information of the image forming apparatuses 104. They are stored in the storing unit 1022 of the server computer 102. An apparatus ID 3041 is an apparatus ID to identify the image forming apparatus 104 (device_id). The apparatus ID 3041 is the same as the apparatus ID 3032 in FIG. 2C. An apparatus type ID 3042, an IP address 3043, an external IP address 3044, and a subnet address 3045 correspond to the apparatus type ID 3021, IP address 3022, external IP address 3023, and subnet address 3024 described in FIG. 2B, respectively. In the example of FIG. 2D, data of three image forming apparatuses in which the apparatus IDs 3041 each for identifying the image forming apparatus are equal to "d0001", "d0002", and "d0003" is held. Data in which they correspond to the apparatus type ID 3021, IP address 3022, external IP address 3023, and subnet address 3024, respectively, is held.

FIG. 2E is an example of a data structure for managing the corresponding driver information of the image forming apparatus 104. The control unit 1021 of the server computer 102 stores them into the storing unit 1022. An apparatus type ID 3051 is an apparatus type ID to identify the type of image forming apparatus 104 (mf_id). The apparatus type ID 3051 is the same as the apparatus type ID 3021. A driver ID 3052 is a driver ID to identify a driver for converting a document into a PDL in order to execute the printing by the image forming apparatus (driver). In the example of FIG. 2E, the apparatus type IDs 3051 of the image forming apparatuses are equal to "mf_0001", "mf_0002", and "mf_0003". It is illustrated that the driver IDs 3052 of "driver_A", "driver_B", and "driver_C" correspond to those data, respectively.

Figure 15:
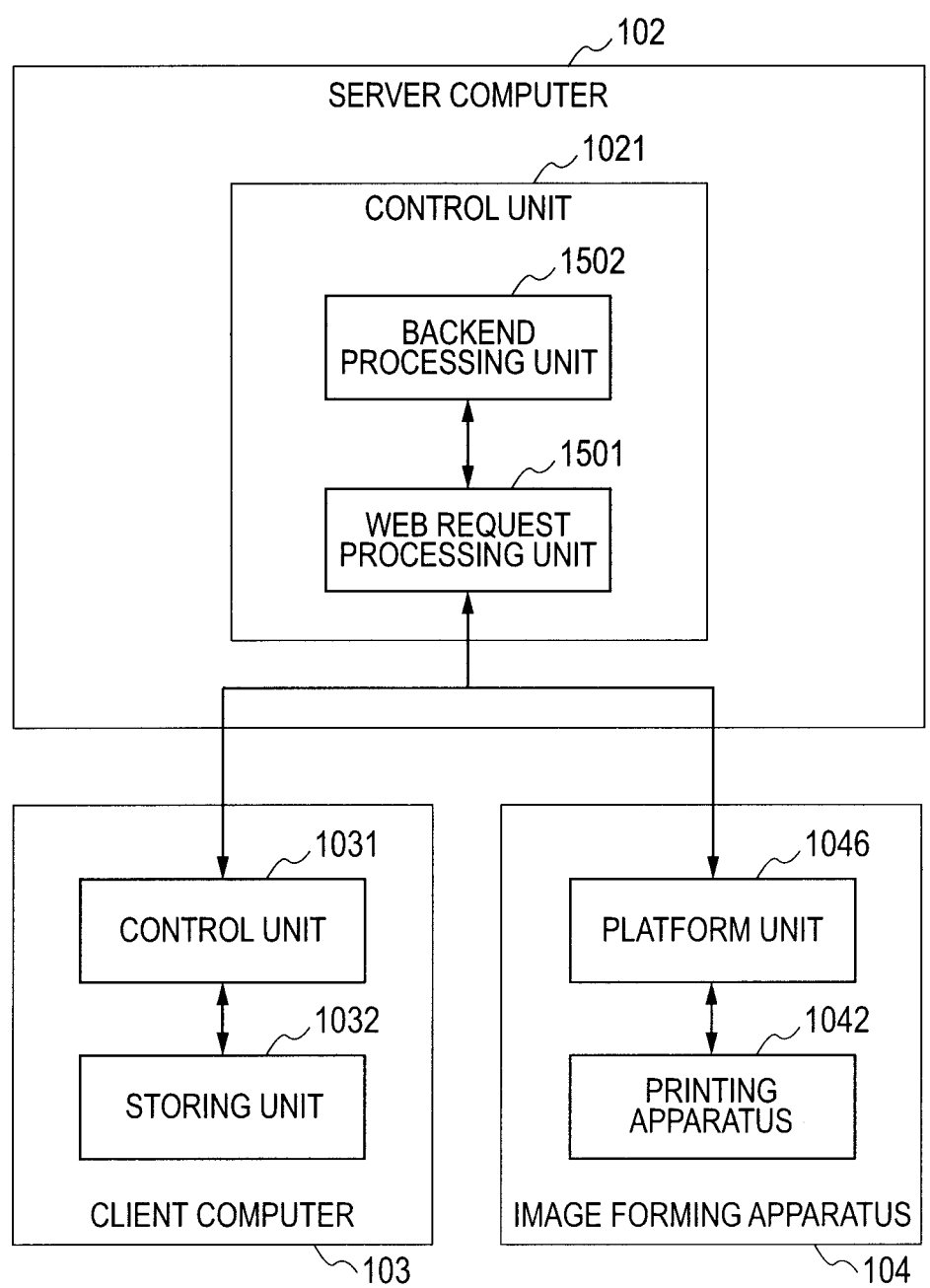
[FIG. 15]

FIG. 15 is a software block diagram of the print system according to the embodiment of the invention and illustrates relations among a software construction in the server computer 102, the client computer 103, and the image forming apparatus 104.

First, the software construction in the server computer 102 will be described. Software modules 1501 to 1502 have been stored in the storing unit 1022 and are loaded and executed by the control unit 1021. A Web request processing unit 1501 receives a request through the control unit 1031 of the client computer 103 or through the platform unit 1046 of the image forming apparatus 104, returns a message showing that the request has been received, and stores the contents of the request into the storing unit 1022. The Web request processing unit 1501 can also use a function of, for example, a virtualized server computer "WebRole" in "Windows Azure (registered trademark)" of Microsoft Corporation. The Web request processing unit 1501 is an example of transmitting means for transmitting a print service situation in response to the request from the client computer 103. The Web request processing unit 1501 is also an example of client control means for stopping control (for example, request) of the client computer in response to completion of a process corresponding to a print request. The Web request processing unit 1501 is also an example of deleting means for deleting the data after completion of the process corresponding to the print request.

A backend processing unit 1502 processes the requests from the client computer 103 and the image forming apparatus 104 through the Web request processing unit 1501. In this instance, the backend processing unit 1502 extracts the contents of the request stored in the storing unit 1022 by the Web request processing unit and executes the processes. For example, the backend processing unit 1502 reads out a print instruction as a request stored in the storing unit 1022 and reads out a document of a document ID included in the print instruction from the storing unit 1022. The backend processing unit 1502 further reads out the driver of the image forming apparatus 104 from the storing unit 1022, converts the read-out document into the PDL data, forms print data, stores into the storing unit 1022, and manages it. As a backend processing unit 1502, for example, the virtualized server computer "WorkerRole" in "Windows Azure (registered trademark)" of Microsoft Corporation can be also used. The backend processing unit 1502 is an example of executing means for transmitting the print data to the image forming apparatus and executing a print service in response to the print request which is transmitted from the client computer.

Figure 3:
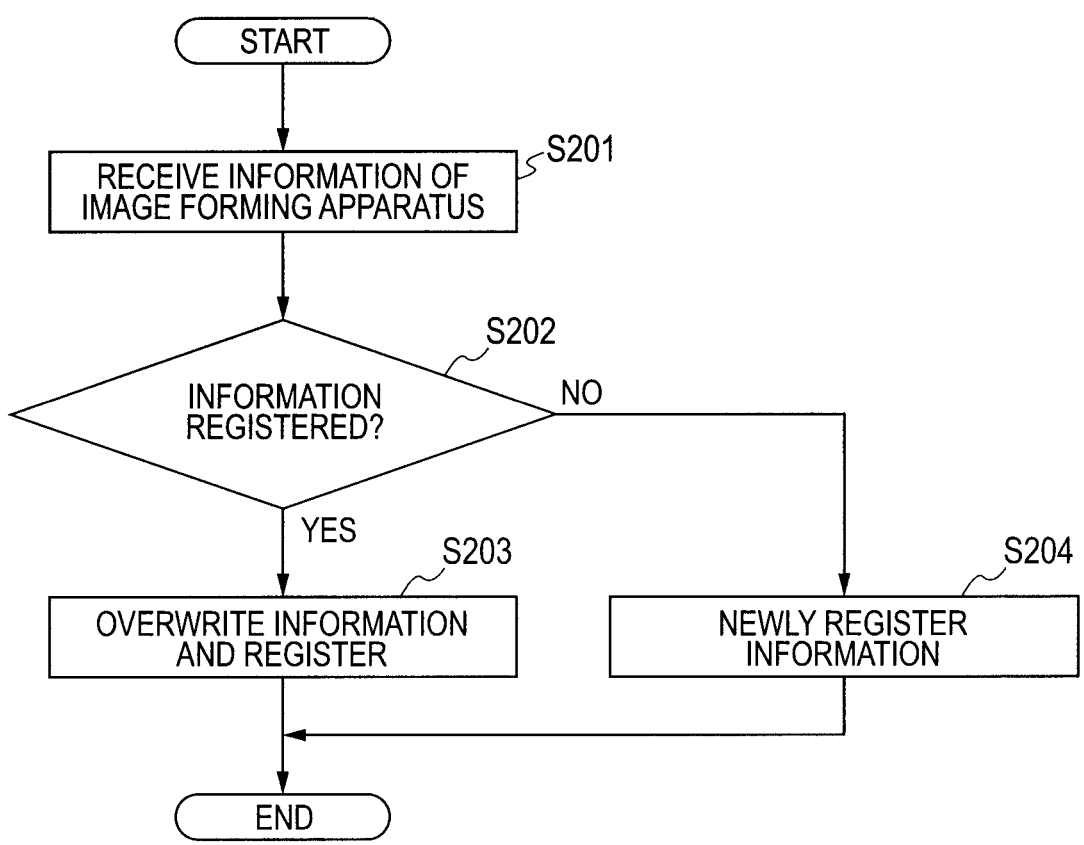
[FIG. 3]

Subsequently, a procedure for registering information held in the image forming apparatus 104 to the server computer 102 will be described. FIG. 3 is a flowchart showing the procedure for registering information held in the image forming apparatus 104 to the server computer 102.

In the flowchart shown in FIG. 3, first, the server computer 102 receives the information of the image forming apparatus 104 (step S201). Specifically speaking, the Web request processing unit 1501 of the server computer 102 receives the information (data illustrated in FIGS. 2A and 2B) transmitted from the image forming apparatus 104.

Subsequently, the server computer 102 discriminates whether or not the received information has already been registered (step S202). In this instance, the Web request processing unit 1501 of the server computer 102 discriminates whether or not the information of the image forming apparatus 104 extracted in step S201 has already been stored in the storing unit 1022. Specifically speaking, whether or not the information shown in FIG. 2B in the information received in step S201 is the same as the information which was stored in the storing unit 1022 in the server computer 102 and shown in FIG. 2D is discriminated.

If the information received by the server computer 102 has already been registered in step S202 (step S202: YES), the server computer 102 overwrites the information received in step S201 and registers (step S203). That is, the Web request processing unit 1501 of the server computer 102 overwrites the information in FIGS. 2A and 2B to the information stored in the storing unit 1022 and shown in FIGS. 2C and 2D. If the information received by the server computer 102 is not registered yet in step S202 (step S202: NO), the server computer 102 newly registers the information received in step S201 (step S204). That is, the Web request processing unit 1501 of the server computer 102 newly stores the information in FIGS. 2A and 2B into the storing unit 1022 as information in FIGS. 2C and 2D.

Figure 4:
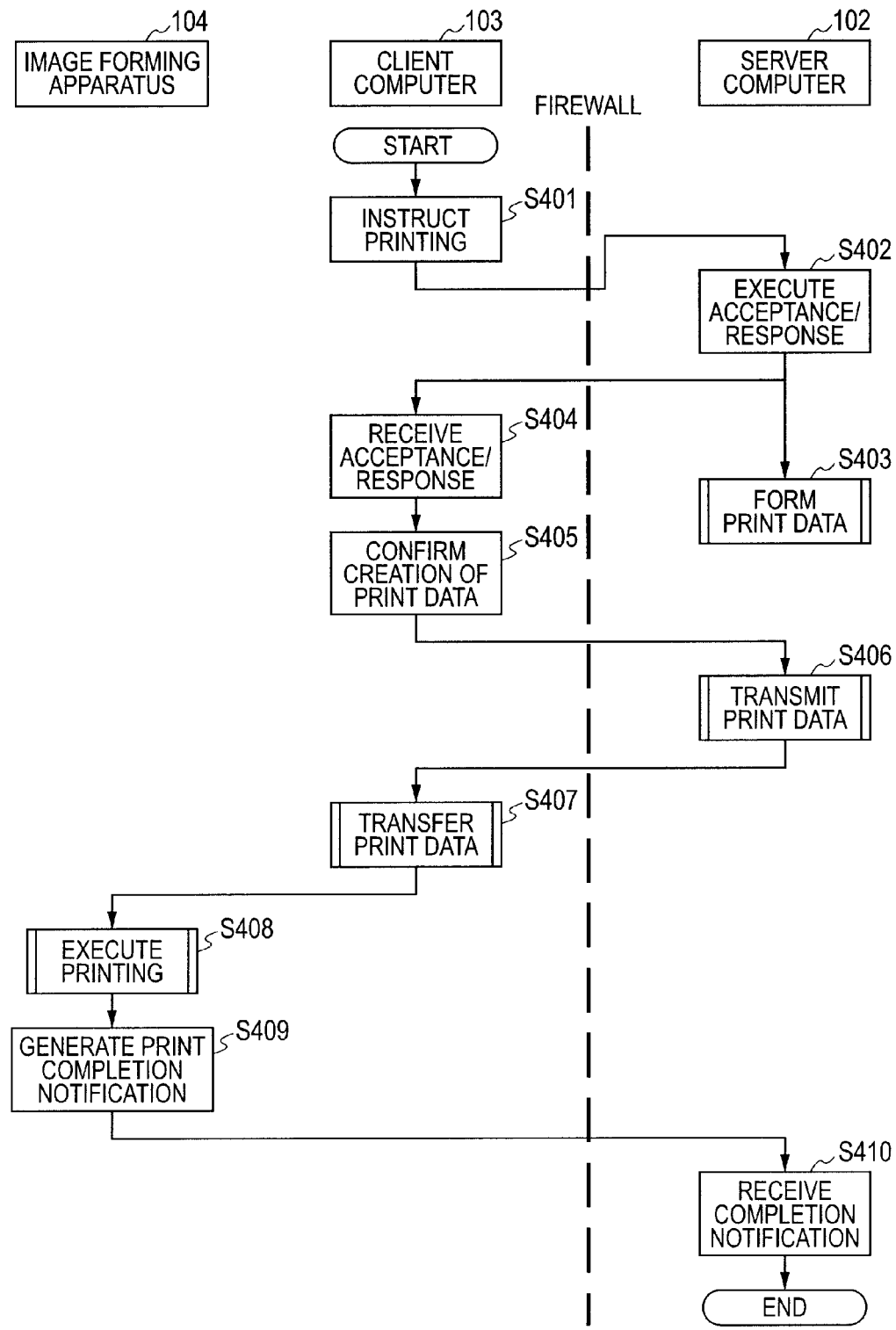
[FIG. 4]

Subsequently, the procedure for the printing process in the print system of the embodiment will be described. FIG. 4 is a flowchart illustrating an outline of the print processing procedure in the print system according to the first embodiment. This flowchart shows a flow in a range from the creation of the print data to the execution of the printing. In the flowchart, it is assumed that the client computer 103 and the image forming apparatus 104 exist in the same network 100a and are connected to the server computer 102 beyond the firewall (refer to FIG. 1).

In the flowchart shown in FIG. 4, first, the client computer 103 instructs the printing (step S401). Specifically speaking, the control unit 1031 of the client computer 103 transmits the print instruction of the document to the server computer 102. The document has been stored in the storing unit 1022 of the server computer 102 and is instructed by a method whereby, for example, a document ID to specify the document is designated through an application program such as a Web browser held in the control unit 1031 of the client computer 103. That is, the document ID serving as an identifier of the document as a print target is transmitted to the server computer 102.

Subsequently, the server computer 102 executes an acceptance/response (step S402). Specifically speaking, the Web request processing unit 1501 of the server computer 102 receives print instruction information transmitted in S401, sets the accepted ID to a print instruction ID, and transmits acceptance/response information added with the print instruction ID to the client computer 103. The print instruction ID denotes an ID which is issued by the server computer 102 in order to allow the server computer 102 to receive the print instruction from the client computer 103 and identify the received print instruction. Based on the print instruction ID, the client computer 103 confirms the creation of the print data and the print execution, which will be described hereinafter, for the server computer 102. The received print instruction information and the acceptance/response information are stored into the storing unit 1022 of the server computer 102.

Subsequently, the print data is formed (step S403). In this instance, the backend processing unit 1502 of the server computer 102 obtains the print instruction information and the acceptance/response information stored in step S402 and forms the print data based on those information. Details of those processes will be described hereinafter.

Subsequently, the client computer 103 receives the acceptance/response (step S404). Specifically speaking, the control unit 1031 of the client computer 103 receives the acceptance/response information transmitted in step S402 and stores the added ID into the storing unit 1032. Subsequently, the client computer 103 confirms the creation of the print data (step S405). Specifically speaking, the control unit 1031 of the client computer 103 obtains the ID added to the acceptance/response information stored in the storing unit 1032 in step S404. Further, the control unit 1031 of the client computer 103 transmits print data creation confirmation information showing whether or not the creation of the print data corresponding to the ID has been completed to the server computer 102.

Subsequently, the server computer 102 transmits the print data (step S406). Specifically speaking, first, the Web request processing unit 1501 of the server computer 102 receives the print data creation confirmation information transmitted in step S405 and confirms whether or not the creation of the print data of the added ID has been completed. If it has been completed, the Web request processing unit 1501 transmits the formed print data to the client computer 103. Details of those processes will be described hereinafter.

Subsequently, the client computer 103 transfers the print data (step S407). Specifically speaking, the control unit 1031 of the client computer 103 receives the print data transmitted in step S406 and transfers it to the image forming apparatus 104. Details of those processes will be also described hereinafter.

Subsequently, the printing is executed (step S408). In this instance, the platform unit 1046 of the image forming apparatus 104 receives the print data transferred in step S407 through the external interface 1048 and executes the printing process of this data. Details of those processes will be described hereinafter. Subsequently, the image forming apparatus 104 generates a print completion notification (step S409). Specifically speaking, after the platform unit 1046 of the image forming apparatus 104 detected the completion of the printing process of step S408, it generates the notification of the print completion to the server computer 102. Finally, the server computer 102 receives the print completion notification (step S410). In this instance, the Web request processing unit 1501 of the server computer 102 receives the print completion notification generated in step S409. Details of those processes will be described hereinafter.

The print data which is used in the print system according to the embodiment will now be described. FIG. 5 is a diagram illustrating an example of the print data which is used in the print system according to the first embodiment. In the embodiment, XML data is used. The XML data is formed in the server computer 102, transmitted to the client computer 103, and transferred from the client computer 103 to the image forming apparatus 104. An envelope portion 501 is an envelope portion of an SOAP message. A UUID 502 is a UUID of the image forming apparatus 104 in which the printing is executed. An IP address 503 is a local IP address of the image forming apparatus 104. An ID 504 is an ID of a Web service serving as a destination when the print completion notification is sent to the server computer 102 after the printing process by the image forming apparatus 104 was finished. An address 505 is an address of a Web service for accepting the printing in the image forming apparatus 104. A user ID 506 is a user ID adapted to perform the print instruction to the image forming apparatus 104. The user ID 506 is the same as the user ID 3011 illustrated in FIG. 2A. A print instruction ID 507 indicates a print instruction ID. A document ID 508 indicates a document ID of the print-instructed document. A format 509 indicates a format of the XML data and shows that the format is a byte train. A document name 510 indicates a name of the print-instructed document. A format 511 indicates a format of the document data. An identifier 512 indicates a reference identifier to the PDL data obtained by converting the document and this identifier is attached as binary data to the XML data. An identifier 513 indicates a reference identifier of binary data which is attached to the XML data. Subsequent data becomes data which is attached. Data 514 indicates a substance of the binary data of the reference identifier shown as an identifier 513 and is the PDL data obtained by converting the document.

Figure 6:
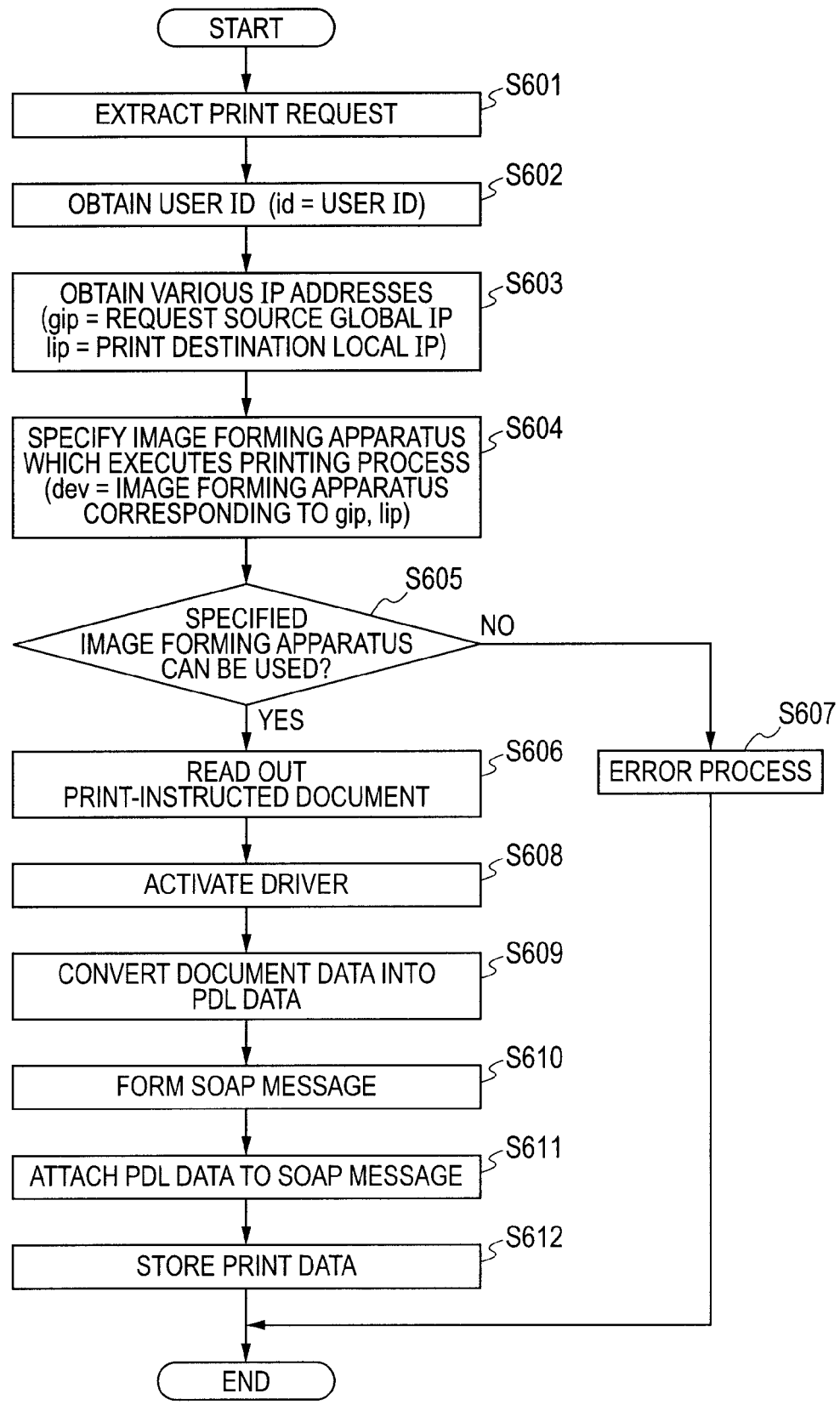
[FIG. 6]

Subsequently, the print data forming process (step S403) illustrated in FIG. 4 will be described in detail. FIG. 6 is a flowchart illustrating a procedure for the print data forming process (step S403).

In the flowchart illustrated in FIG. 6, first, a print request is extracted (step S601). Specifically speaking, the backend processing unit 1502 of the server computer 102 obtains the print instruction information and the acceptance/response information stored in step S402 from the storing unit 1022. Subsequently, the user ID is obtained (step S602). In this instance, the backend processing unit 1502 of the server computer 102 obtains the user ID from the information extracted in step S601. Subsequently, various kinds of IP addresses are obtained (step S603). In this instance, the backend processing unit 1502 of the server computer 102 obtains the IP address of the client computer 103 of a request source and the local IP address of the image forming apparatus 104 serving as a print destination from the information extracted in step S601.

Subsequently, the image forming apparatus for executing the printing process is specified (step S604). Specifically speaking, the backend processing unit 1502 of the server computer 102 specifies the image forming apparatus 104 for executing the printing process based on the information obtained in step S603. For example, it is assumed that the IP address is equal to "xxx.xxx.127.10" and the local IP address of the image forming apparatus 104 serving as a print destination is equal to "192.168.10.20". In this case, the apparatus type ID 3051 to identify the image forming apparatus 104 is decided as "d0001" by the held data as illustrated in FIG. 2D.

Subsequently, whether or not the specified image forming apparatus can be used is discriminated (step S605). Specifically speaking, the backend processing unit 1502 of the server computer 102 discriminates whether or not the user ID obtained in step S602 is included in the data of the image forming apparatus 104 specified in step S604. For example, it is assumed that the apparatus type ID 3051 is equal to "d0001" and the user ID 3031 is equal to "u00001". In this case, whether or not the data of "u00001" in the held data includes the apparatus ID "d0001" to identify the image forming apparatus 104 which can be used is discriminated (refer to FIG. 2C).

If the image forming apparatus specified in step S604 cannot be used (step S605: NO), an error process is executed (step S607). In this instance, the backend processing unit 1502 of the server computer 102 transmits error information showing that the user cannot use the image forming apparatus 104 to the client computer 103. The processing routine is finished. If the image forming apparatus specified in step S604 can be used (step S605: YES), the print-instructed document is read out (step S606). In this instance, the backend processing unit 1502 of the server computer 102 reads out the print-instructed document from the storing unit 1022 based on the information obtained in step S601.

Subsequently, the driver corresponding to the specified image forming apparatus is activated (step S608). Specifically speaking, the backend processing unit 1502 of the server computer 102 reads out the driver corresponding to the image forming apparatus 104 specified in step S604 from the data (FIG. 2E) for managing the corresponding driver information of the image forming apparatus 104 held in the storing unit 1022 and activates it.

Subsequently, the document data is converted into the PDL data (step S609). In this instance, the backend processing unit 1502 of the server computer 102 converts the print-instructed document of the document ID which was read out in step S606 and which has the document ID into the PDL data by the driver activated in step S608. Subsequently, the SOAP message is formed (step S610). In this instance, the backend processing unit 1502 of the server computer 102 forms the SOAP message including the envelope portion 501 to the identifier 512 as described in FIG. 5 based on the information obtained in step S601. The PDL data is attached to the SOAP message (step S611). In this instance, the backend processing unit 1502 of the server computer 102 attaches the PDL data converted in step S609 to the SOAP message formed in step S610 like an identifier 513 and data 513 illustrated in FIG. 5. Finally, the print data is stored (step S612). In this instance, the backend processing unit 1502 of the server computer 102 stores the data formed in step S611 as print data into the storing unit 1022 together with the print instruction ID in which the print instruction has been accepted.

Figure 7:
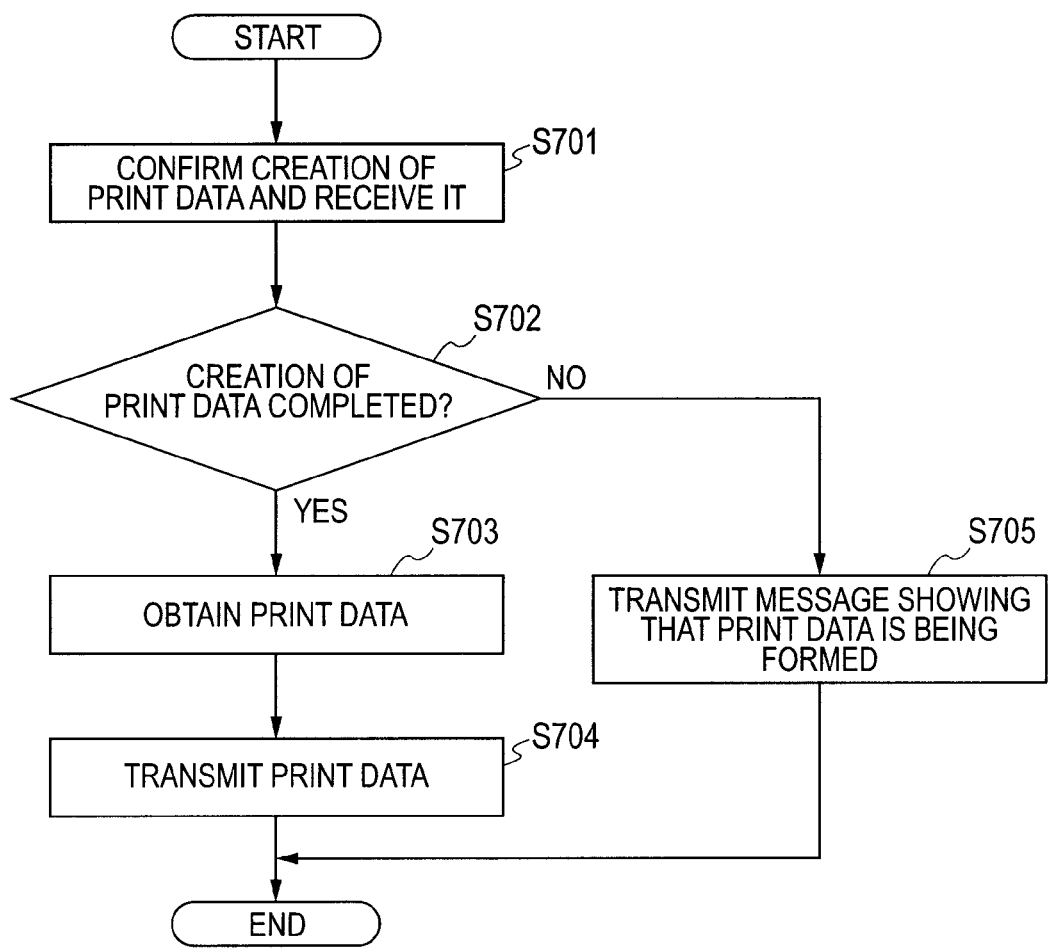
[FIG. 7]

Subsequently, the transmitting process (step S406) of the print data which is executed by the server computer 102 will be described in detail. FIG. 7 is a flowchart illustrating a procedure for the transmitting process (step S406) of the print data which is executed by the server computer 102.

In the flowchart illustrated in FIG. 7, first, the confirmation of the creation of the print data and its reception are performed (step S701). Specifically speaking, the Web request processing unit 1501 of the server computer 102 receives the creation confirmation of the print data transmitted from the client computer 103 by the process of step S405 and reads out the print instruction ID in which the print instruction was accepted. Subsequently, whether or not the creation of the print data has been completed is discriminated (step S702). Specifically speaking, the Web request processing unit 1501 of the server computer 102 confirms whether or not the print data corresponding to the print instruction ID in which the print instruction was accepted has been stored in the storing unit 1022.

If the creation of the print data has been completed in step S702 (step S702: YES), the print data is obtained (step S703). In this instance, the Web request processing unit 1501 of the server computer 102 reads out the print data corresponding to the print instruction ID which was read out in step S701 and in which the print instruction was accepted from the storing unit 1022. The print data is transmitted (step S704). In this instance, the Web request processing unit 1501 of the server computer 102 transmits the print data obtained in step S703 to the client computer 103. If the creation of the print data is not completed in step S702 (step S702: NO), a message showing that the print data is being formed is transmitted (step S705). Specifically speaking, since the creation of the print data is not completed, the Web request processing unit 1501 of the server computer 102 transmits a response showing that the print data is being formed to the client computer 103.

Figure 8:
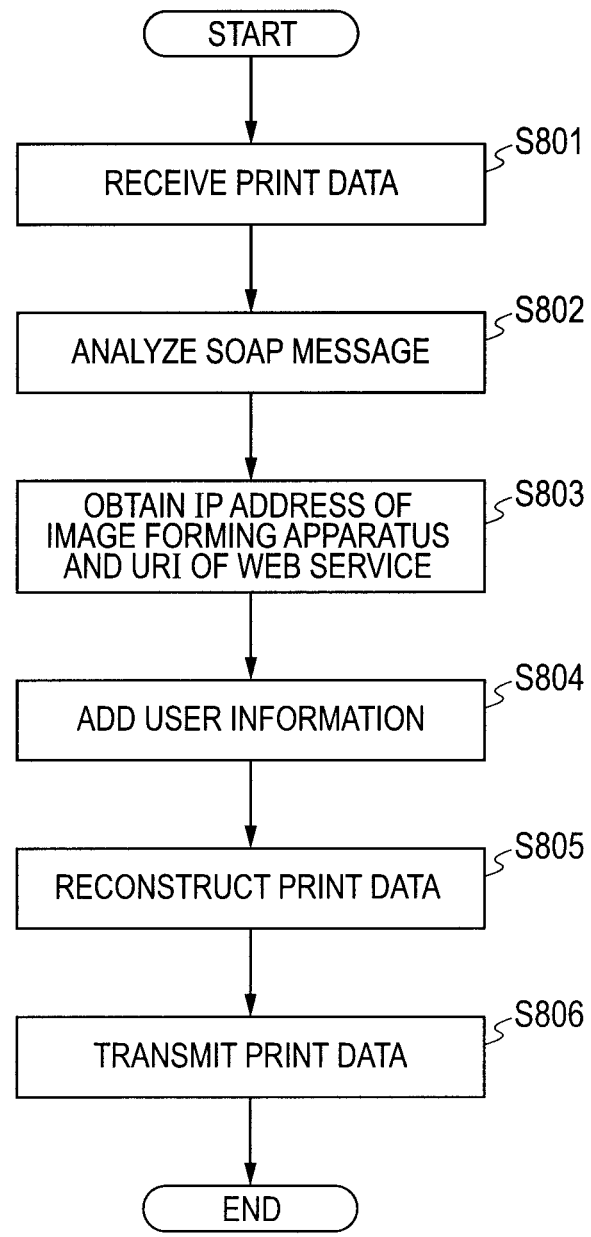
[FIG. 8]

Subsequently, the transferring process (step S407) of the print data which is executed by the client computer 103 will be described in detail. FIG. 8 is a flowchart illustrating a procedure for the transferring process (step S407) of the print data which is executed by the client computer 103.

In the flowchart illustrated in FIG. 8, first, the print data is received (step S801). Specifically speaking, the control unit 1031 of the client computer 103 receives the print data transmitted from the server computer 102 by the process of step S704. Subsequently, the SOAP message is analyzed (step S802). In this instance, the control unit 1031 of the client computer 103 reads out the SOAP message of the print data received in step S801 and develops. Subsequently, the IP address of the image forming apparatus 104 and a URI of the Web service are obtained (step S803). In this instance, the control unit 1031 of the client computer 103 obtains the IP address of the image forming apparatus 104 and a URI of the Web service from the SOAP message of the print data read out in step S802. They correspond to the IP address 503 and the address 505 illustrated in FIG. 5.

Subsequently, the user information is added (step S804). Specifically speaking, the control unit 1031 of the client computer 103 adds the user information like a user ID 506 illustrated in FIG. 5 to the SOAP message of the print data readout in step S802. Subsequently, the control unit 1031 reconstructs the print data (step S805). Specifically speaking, the control unit 1031 reconstructs the print data received in step S801 by the SOAP message added with the user information in step S804. The control unit 1031 transmits the print data (step S806). In this instance, the control unit 1031 of the client computer 103 transmits the print data reconstructed in step S805 to a print Web service URI of the image forming apparatus 104 corresponding to the IP address obtained in step S803.

Figure 9:
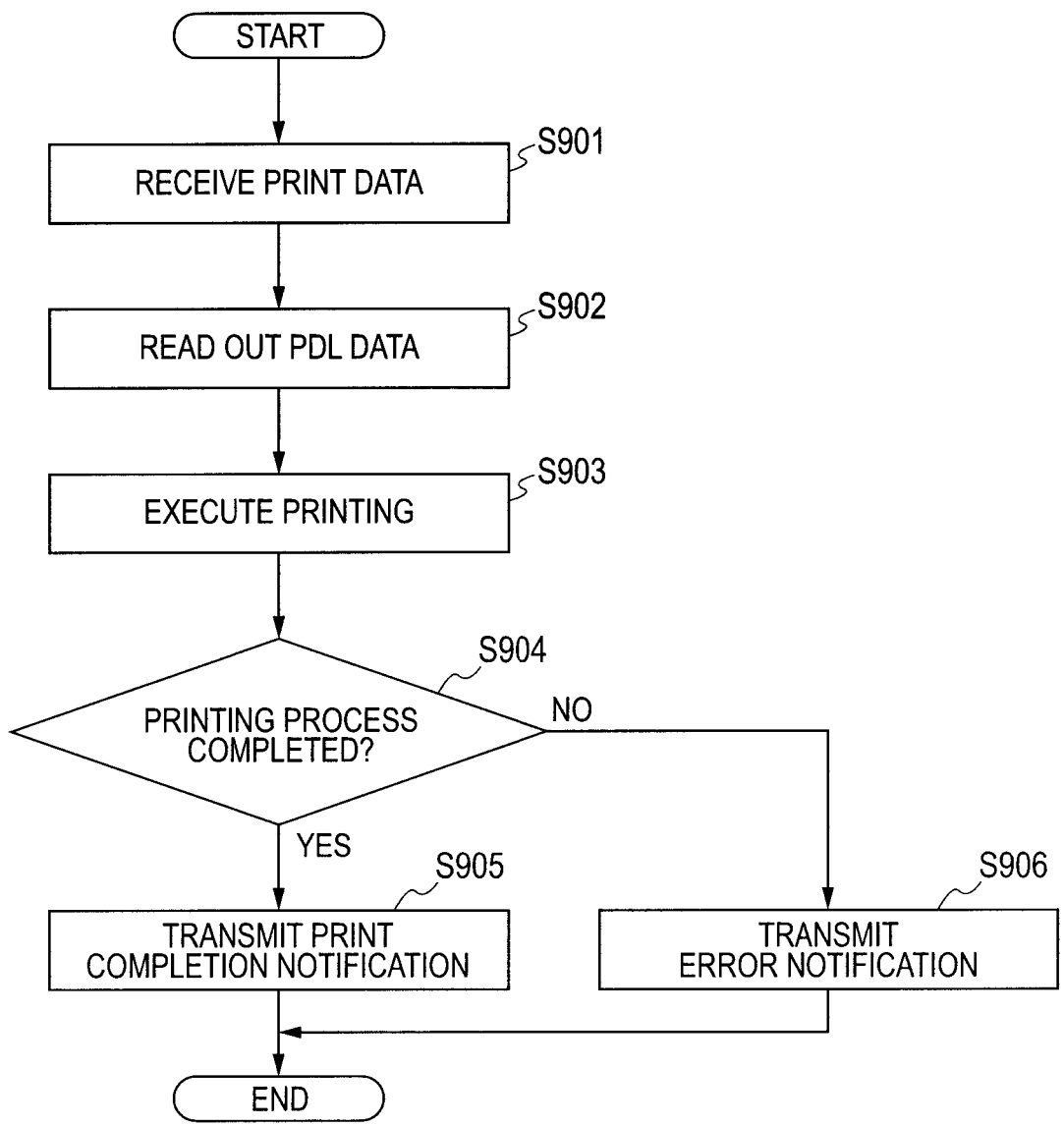
[FIG. 9]

Subsequently, the printing process (step S408) which is executed by the image forming apparatus 104 will be described in detail. FIG. 9 is a flowchart illustrating a procedure for the printing process (step S408) which is executed by the image forming apparatus 104.

In the flowchart illustrated in FIG. 9, first, the print data is received (step S901). Specifically speaking, the platform unit 1046 of the image forming apparatus 104 receives through the external interface 1048 the print data transmitted from the client computer 103 by the process of step S806. Subsequently, the PDL data is read out (step S902). In this instance, the platform unit 1046 of the image forming apparatus 104 reads out the PDL data from the print data received in step S901. Subsequently, the printing is executed (step S903). In this instance, the platform unit 1046 of the image forming apparatus 104 sends the PDL data read out in step S902 to the printing apparatus 1042 of the image forming apparatus 104, thereby allowing the printing apparatus to execute the printing.

Subsequently, whether or not the printing process has been completed is detected (step S904). Specifically speaking, the platform unit 1046 of the image forming apparatus 104 detects whether or not the printing process executed in step S903 has normally been finished. If the printing process has been completed in step S904 (step S904: YES), the print completion notification is transmitted (step S905). Specifically speaking, the platform unit 1046 of the image forming apparatus 104 determines that the printing process has normally been finished, adds a print completion information ID, and transmits the resultant data to the server computer 102. If the printing process is not completed in step S904 (step S904: NO), an error notification is transmitted (step S906). Specifically speaking, the platform unit 1046 of the image forming apparatus 104 adds a print error ID and a print instruction ID as a print error and transmits the resultant data as print completion information to the server computer 102. The print completion information is information to notify that the printing process has been completed. In more detail, it is data which is transmitted to the server computer 102 by the image forming apparatus 104 and the print instruction ID and the print error ID are included in the data. The print error ID is an identifier showing a type of error occurring at the time of the print execution. When the printing process is normally finished, 0 is returned.

Figure 10:
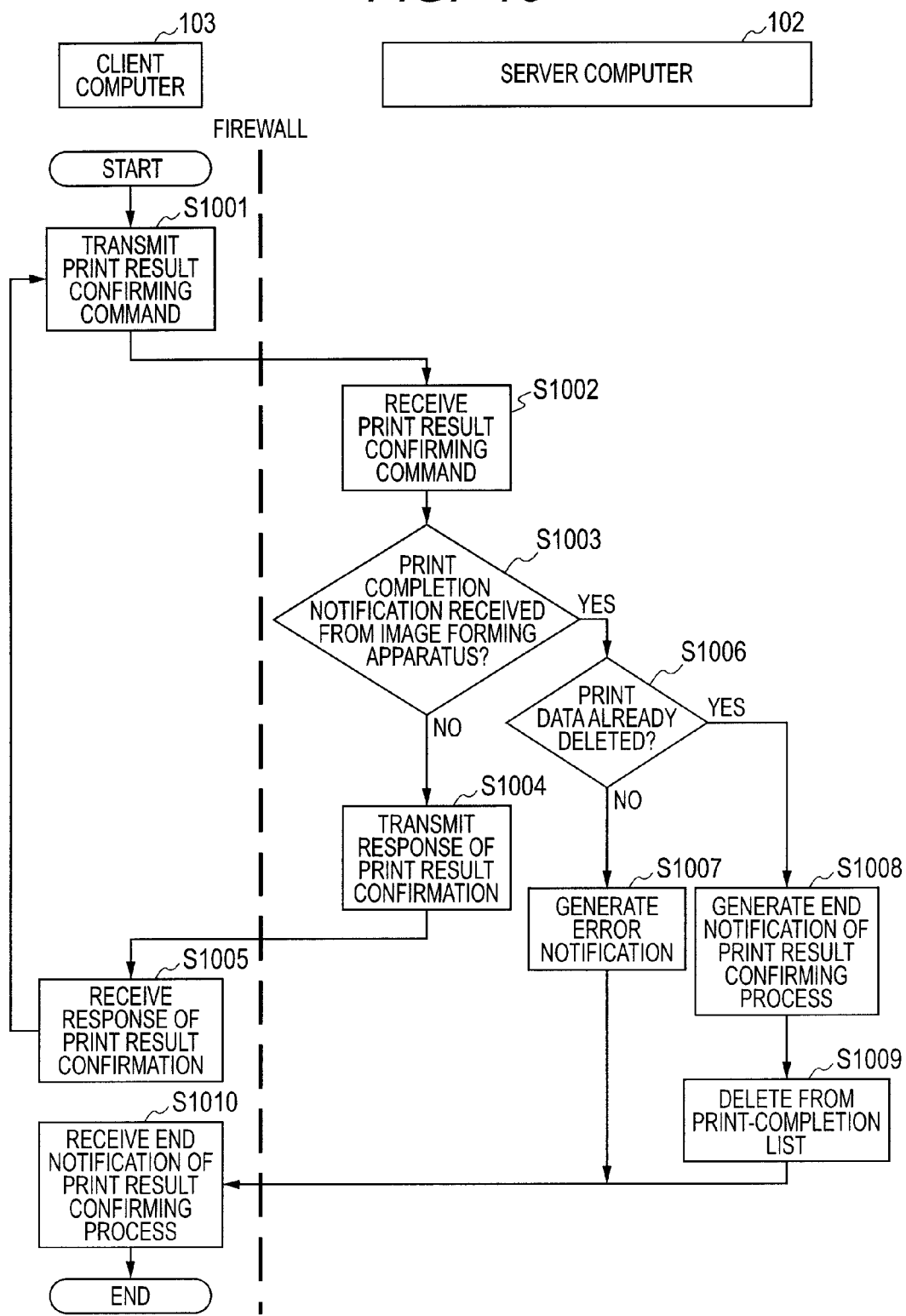
[FIG. 10]

The print result confirming process between the server computer 102 and the client computer 103 will now be described. FIG. 10 is a flowchart illustrating a procedure for the print result confirming process between the server computer 102 and the client computer 103. The process illustrated in the flowchart is executed on the assumption that the client computer 103 is connected to the server computer 102 beyond the firewall. The process is executed in step S806 (refer to FIG. 8) in which the client computer 103 transmits the print data to the image forming apparatus 104 and subsequent steps.

The process of FIG. 10 is started after the elapse of a predetermined period of time after the print request had been transmitted from the client computer 103 to the server computer.

In the flowchart illustrated in FIG. 10, first, the client computer 103 transmits a print result confirming command (step S1001). In this instance, an example of transmitting means as a control unit 1031 of the client computer 103 transmits the print result confirming command to confirm whether or not the printing process of the print data corresponding to the print instruction ID has been completed to the server computer 102. Subsequently, the server computer 102 receives the print result confirming command (step S1002). Specifically speaking, the Web request processing unit 1501 of the server computer 102 receives the print result confirming command transmitted in step S1001 and reads out the print instruction ID. Subsequently, whether or not the server computer 102 has received the print completion notification from the image forming apparatus 104 (step S1003). In this instance, the Web request processing unit 1501 of the server computer 102 detects whether or not the print completion information as a print execution result of the print data corresponding to the print instruction ID read out in step S1002 has been received from the image forming apparatus 104.

If the print completion notification from the image forming apparatus 104 is not received in step S1003 (step S1003: NO), a response of the print result confirmation is transmitted (step S1004). This process is executed in the case where the image forming apparatus 104 is executing the printing process. Specifically speaking, the Web request processing unit 1501 of the server computer 102 transmits a message showing that the apparatus is waiting for the process as a response of the print result confirmation to the client computer 103. Subsequently, the control unit 1031 of the client computer 103 (an example of obtaining means for obtaining a processing situation of the print service) receives the print result confirmation response (step S1005). In this instance, the control unit 1031 of the client computer 103 receives the print result confirmation response transmitted from the server computer 102 by the process of step S1004. In this case, since the apparatus is waiting for the process, the result confirming process is finished. After that, after the elapse of the designated time, the control unit 1031 of the client computer 103 repeats the print result confirming process again from step S1001.

If the print completion notification from the image forming apparatus 104 has been received in step S1003 (step S1003: YES), the server computer 102 detects whether or not the print data (print-processed data) has been deleted (step S1006). Specifically speaking, the Web request processing unit 1501 of the server computer 102 discriminates whether or not the print data corresponding to the print instruction ID read out by the process of step S1002 has been deleted from the storing unit 1022. If the print data is not deleted in step S1006 (step S1006: NO), the server computer 102 generates an error notification (step S1007). Specifically speaking, the Web request processing unit 1501 of the server computer 102 notifies the client computer 103 of an error of the print execution result of the print data corresponding to the print instruction ID.

If the print data has been deleted in step S1006 (step S1006: YES), the server computer 102 generates a print result confirming process end notification (step S1008). Specifically speaking, the Web request processing unit 1501 of the server computer 102 determines that the printing process of the print data corresponding to the print instruction ID has normally been finished, and generates a notification for allowing the client computer 103 to finish the print result confirming process to the client computer 103. Thus, the print result confirmation which is repeatedly transmitted from the client computer 103 in step S1001 is finished. In this instance, for example, a case where the Web request processing unit 1501 of the server computer 102 transmits a finishing method of a script which has repeatedly been called by the control unit 1031 of the client computer 103 is considered. Finally, the server computer 102 deletes the information regarding the print data whose printing process has been completed from a print completion list (step S1009). Specifically speaking, the Web request processing unit 1501 of the server computer 102 deletes the print instruction ID from a print normal end list stored in the storing unit 1022. The print normal end list is a list which is used for the server computer 102 to notify the client computer 103 of the print instruction ID in which the print execution has normally been completed based on the print completion information received from the image forming apparatus 104. This list is held in the server computer 102. In step S1010, the control unit 1031 (example of receiving means) of the client apparatus receives the information transmitted in step S1009 and the processing routine is finished.

According to the first embodiment, in response to the request, for example, the print result confirming command which is repeatedly transmitted from the client computer, the Web request processing unit 1501 as transmitting means of the server computer transmits a processing situation of the print service which is executed. Although the request has repeatedly been transmitted, the client computer is allowed to stop the transmission of the request in response to the completion of the process corresponding to the print request in the print service which is provided. That is, the process for confirming the regular processing situation is stopped.

In this manner, according to the embodiment, when the distributed print system environment is allowed to execute the printing from the client computer, a polling process in the client computer can be stopped at proper timing. Thus, a load of the network system can be reduced.

Figure 11:
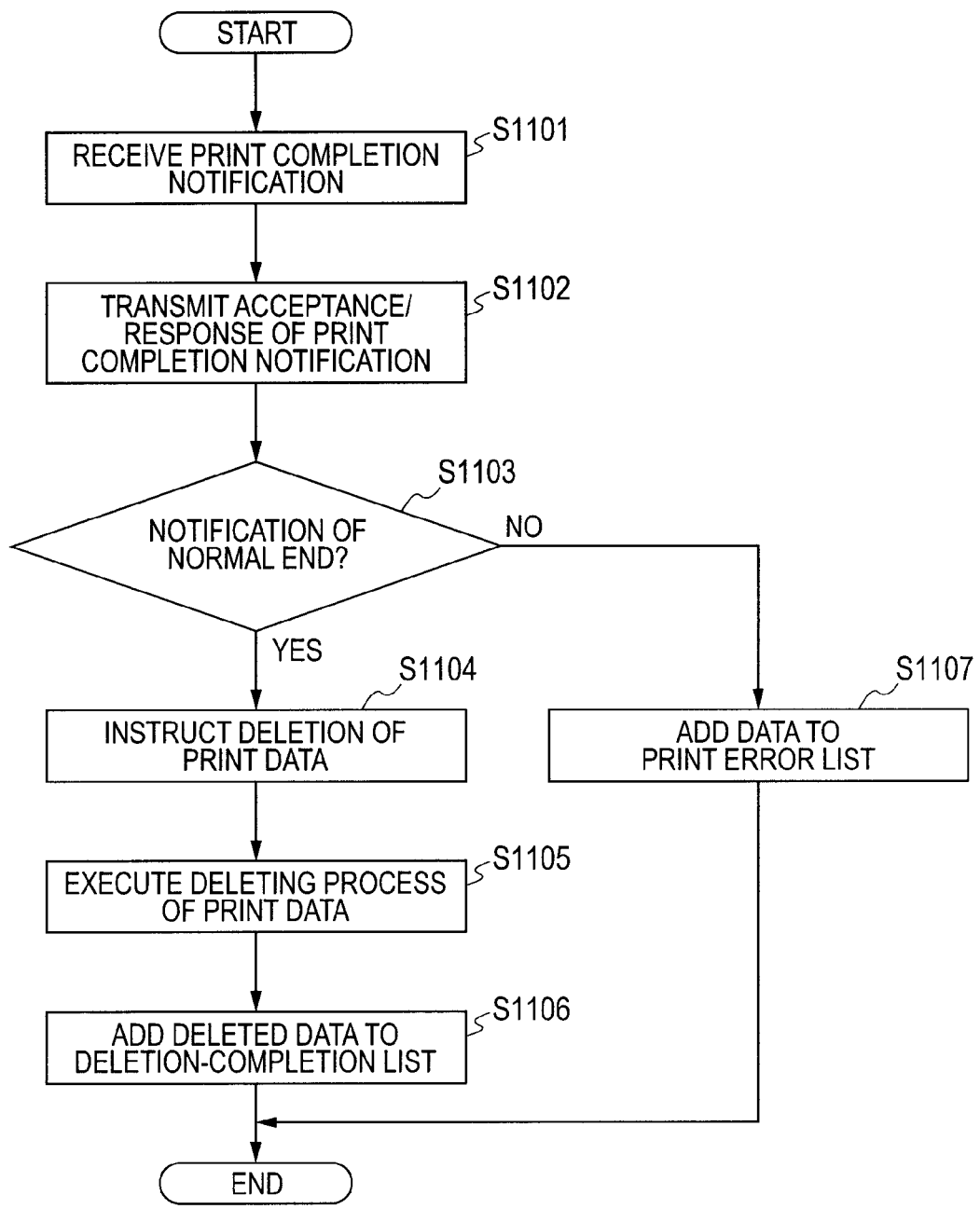
[FIG. 11]

Subsequently, the print completion notification receiving process (step S410) by the server computer 102 will be described in detail. FIG. 11 is a flowchart illustrating a procedure for the print completion notification receiving process (step S410) by the server computer 102.

In the flowchart illustrated in FIG. 11, first, the print completion notification is received (step S1101). In this instance, the Web request processing unit 1501 of the server computer 102 receives the print completion information transmitted from the image forming apparatus 104 by the process of step S905 or step S906 and reads out the print instruction ID. Subsequently, an acceptance/response of the print completion notification is transmitted (step S1102). In this instance, the Web request processing unit 1501 of the server computer 102 notifies the image forming apparatus 104 that the reception in step S1101 has been completed. Subsequently, whether or not the received print completion notification is a normal end notification is discriminated (step S1103). Specifically speaking, the Web request processing unit 1501 of the server computer 102 discriminates whether or not the print completion information received in step S1101 is the notification showing the normal end.

If the print completion notification received in step S1103 is not the normal end notification (error notification) (step S1103: NO), data is added to the print error list (step S1107). Specifically speaking, the Web request processing unit 1501 of the server computer 102 adds the print instruction ID to the error information showing that the print execution of the print data corresponding to the print instruction ID has been finished as an error and stores the resultant information into the print error list in the storing unit 1022. The print error list is such a list that the ID of the print instruction acceptance is added to the error information showing that the print execution of the print data corresponding to the print instruction ID has been finished as an error and the resultant information is stored in the storing unit 1022.

If the print completion notification received in step S1103 is the notification showing the normal end (step S1103: YES), the deletion of the print data is instructed (step S1104). Specifically speaking, the Web request processing unit 1501 of the server computer 102 is instructed so as to delete the print data corresponding to the print instruction ID read out in step S1101 from the storing unit 1022. Subsequently, the deleting process of the print data is executed (step S1105). Specifically speaking, the backend processing unit 1502 of the server computer 102 deletes the print data whose deletion has been instructed in step S1104 from the storing unit 1022. The deleted data is added to a deletion-completion list (step S1106). Specifically speaking, the backend processing unit 1502 of the server computer 102 determines that the printing process of the print data corresponding to the print instruction ID has been completed, and adds the print instruction ID to the print normal end list in the storing unit 1022.

As described above, according to the embodiment, in an environment in which the server computer 102 exists at a location beyond the firewall, even if the driver of the image forming apparatus 104 is not installed in the client computer 103, the desirable printing process can be executed. Even if the user makes the print instruction from the different client computer 103, the desirable printing process can be executed and a use efficiency is improved.

[Second Embodiment]

The second embodiment of the invention will now be described. The embodiment will be described with respect to a process in which in the print result confirming process between the server computer 102 and the client computer 103, in the case where the print execution in the image forming apparatus 104 became an error, an alternative image forming apparatus is notified. Only portions different from the description in the first embodiment will be described here.

Figure 12:
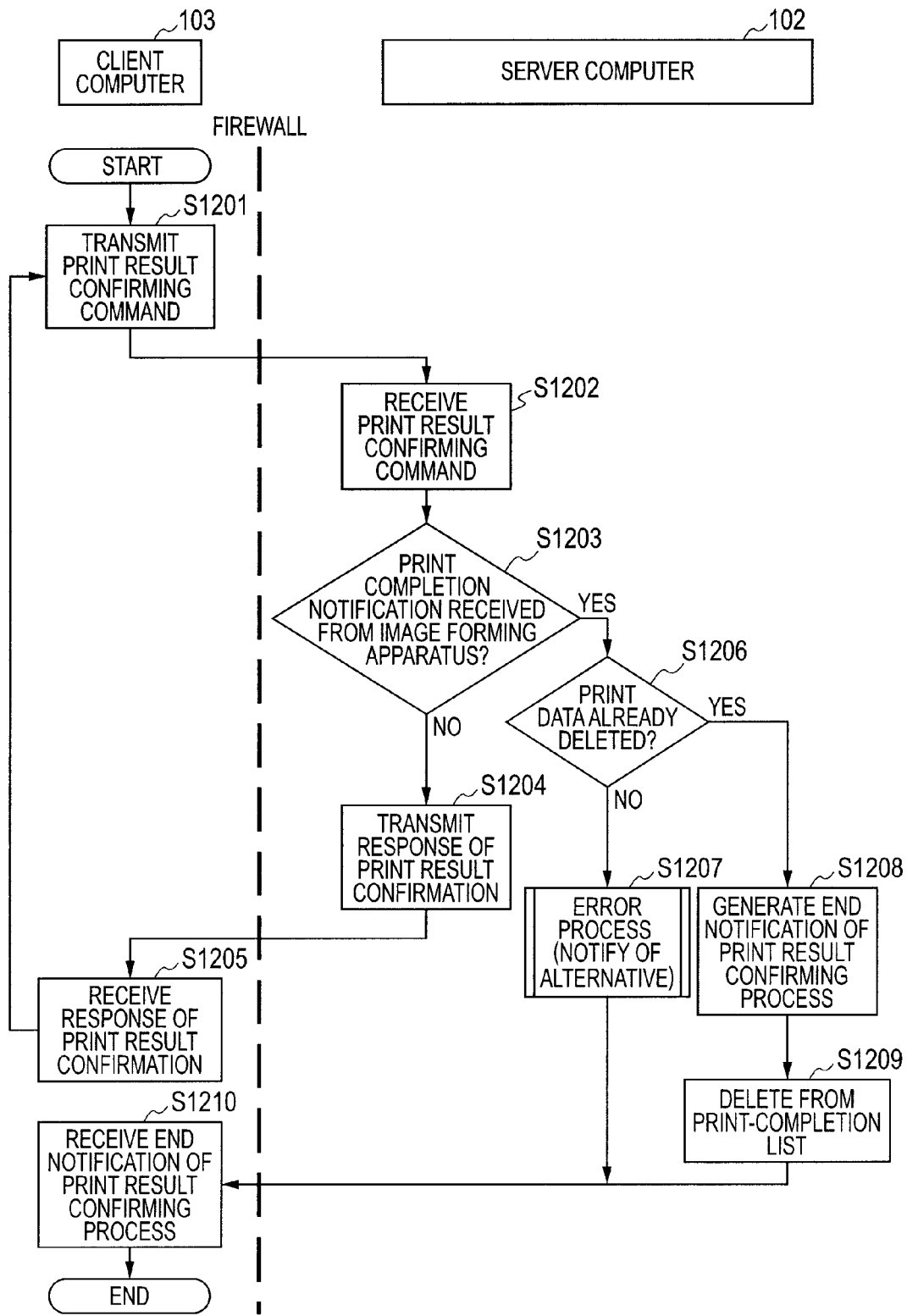
[FIG. 12]

FIG. 12 is a flowchart illustrating a procedure for the print result confirming process between the server computer 102 and the client computer 103 in the second embodiment. Also in the process illustrated in the flowchart, it is presumed that the client computer 103 is connected to the server computer 102 beyond the firewall. The embodiment differs with respect to only a point that although the error notification (refer to step S1007 in FIG. 10) is performed in the first embodiment, the alternative image forming apparatus is notified as an error process (step S1207). In this error process (step S1207), the Web request processing unit 1501 of the server computer 102 notifies the client computer 103 of the alternative image forming apparatus 104 as an error process of the print execution result corresponding to the print instruction ID. The error process (step S1207) will be described in detail hereinbelow.

Figure 13:
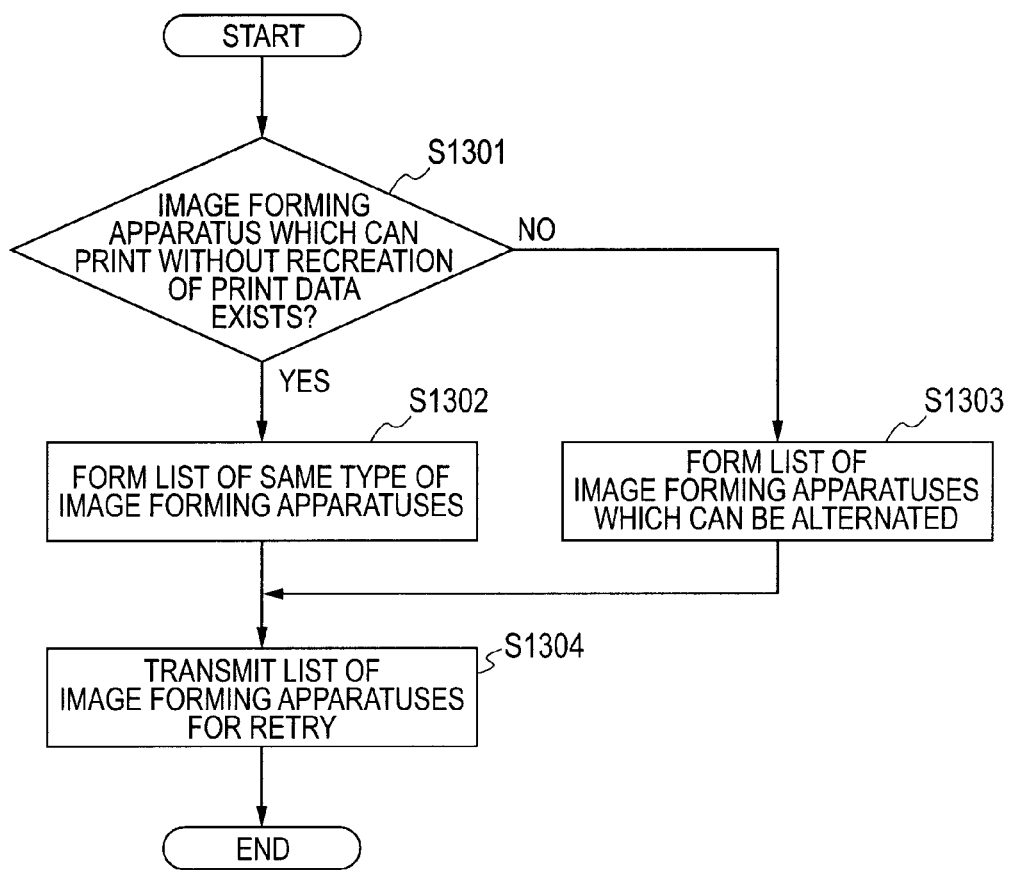
[FIG. 13]

FIG. 13 is a flowchart illustrating a procedure for the error process (step S1207) which is executed by the server computer 102. In the flowchart illustrated in FIG. 13, first, whether or not there is an image forming apparatus which can print without recreating the print data is detected (step S1301). Specifically speaking, the Web request processing unit 1501 of the server computer 102 discriminates whether or not there is an image forming apparatus of the same apparatus type ID among other image forming apparatuses which hold the same external IP address and same subnet address as those of the image forming apparatus 104 which caused the print execution error. Such a discrimination is made by checking whether or not the same data as the apparatus type ID 3042, external IP address 3044, and subnet address 3045 exists like data illustrated in FIG. 2D.

If the image forming apparatus which can print without recreating the print data exists in step S1301 (step S1301: YES), a list of image forming apparatuses of the same type is formed (step S1302). Specifically speaking, the Web request processing unit 1501 of the server computer 102 forms a list of image forming apparatuses which hold the same external IP address and same subnet address as those of the image forming apparatus 104 which caused the print execution error and which have the same apparatus type ID as illustrated in FIG. 2D. If the image forming apparatus which can print without recreating the print data does not exist in step S1301 (step S1301: NO), a list of image forming apparatuses which can be alternated is formed (step S1303). Specifically speaking, the Web request processing unit 1501 of the server computer 102 holds the same external IP address and same subnet address as those of the image forming apparatus 104 which caused the print execution error as illustrated in FIG. 2D. The Web request processing unit 1501 forms a list of image forming apparatuses having the different apparatus type ID (alternative image forming apparatus information). A list of image forming apparatuses for retry is transmitted (step S1304). Specifically speaking, the Web request processing unit 1501 of the server computer 102 transmits the image forming apparatus lists formed in steps S1302 and S1303 to the client computer 103 together with the error notification.

As described above, according to the embodiment, in a manner similar to the first embodiment, when the distributed print system environment is allowed to execute the printing from the client computer, the polling process in the client computer can be stopped at the proper timing. Thus, the load of the network system can be reduced. Even if an error occurred in the print execution in the image forming apparatus 104, the client computer 103 can be notified of the information of the alternative image forming apparatuses and the use efficiency is further improved.

[Third Embodiment]

The third embodiment of the invention will now be described. The embodiment differs with respect to a point that the printing process (step S408) in the image forming apparatus 104 illustrated in FIG. 4 becomes a print preparation as a print-possible state in the image forming apparatus 104 instead of the instantaneous print execution. Only processes different from those in the first embodiment will be described hereinbelow.

Figure 14:
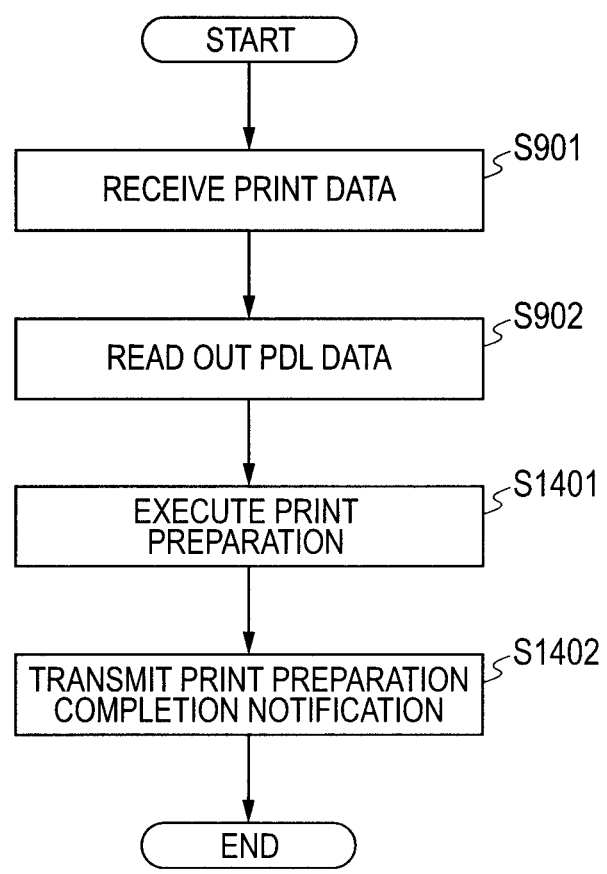
[FIG. 14]

FIG. 14 is a flowchart illustrating a procedure for the printing process (step S408) which is executed by the image forming apparatus 104 in the third embodiment. In the diagram, since processes of steps S901 and S902 are similar to those illustrated in FIG. 9, their description is omitted. In the flowchart illustrated in FIG. 14, the print preparation is executed (step S1401) subsequent to the process of step S902. Specifically speaking, the platform unit 1046 of the image forming apparatus 104 stores the PDL data read out in step S902 into the indirect storing unit 1045, sets the PDL data into a print-possible state, and executes the print preparation. As for the PDL data which has been print-prepared as a print-possible state, the user interface 1047 or the external interface 1048 of the image forming apparatus 104 receives an instruction including authentication from the user after that and accepts the instruction. Based on the accepted instruction, the platform unit 1046 reads out the print-prepared PDL data in the print-possible state from the indirect storing unit 1045. The platform unit 1046 transmits the read-out print-prepared PDL data in the print-possible state to the printing apparatus 1042, so that the printing is executed. Finally, a print preparation completion notification is transmitted (step S1402). Specifically speaking, the platform unit 1046 of the image forming apparatus 104 adds a print preparation completion notification ID by presuming that the print preparing process has succeeded as a print-possible state, and transmits the resultant information to the server computer 102.

As described above, according to the embodiment, by executing the print preparing process as a print-possible state in the image forming apparatus 104 instead of the instantaneous printing process execution, the user can instruct the image forming apparatus 104 to execute the printing after that, and the use efficiency is further improved.

[Other Embodiments]

Aspects of the present invention can also be realized by a computer or a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-231433, filed Oct. 5, 2009, which is hereby incorporated by reference herein in its entirety.

The invention claimed is:

1. A server apparatus which communicates with a client apparatus and an image forming apparatus, the server apparatus comprising:

an execution unit configured to execute a print service to transmit print data to the image forming apparatus and allow the image forming apparatus to perform a print process to print the print data in accordance with a print request transmitted from the client apparatus;

a transmission unit configured to transmit a print completion notification to the client apparatus in response to completion of the print process for the print request by the image forming apparatus, wherein, when the client apparatus repeatedly makes an inquiry about a processing situation of the print request, the transmission unit transmits a message indicating that the print process is under processing to the client apparatus, until it is confirmed that the image forming apparatus has completed the print process for the print request; and a client control unit configured to instruct the client apparatus to stop the repeated inquiry when the transmission unit transmits the print completion notification to the client apparatus.

2. The server apparatus according to claim 1, further comprising a deletion unit configured to delete data obtained from the print service executed by the execution unit after the process corresponding to the print request is completed in the print service executed by the execution unit.

3. A control method carried out in a server apparatus which communicates with a client apparatus and an image forming apparatus, the method comprising:

executing a print service to transmit print data to the image forming apparatus and allowing the image forming apparatus to perform a print process to print the print data in accordance with a print request transmitted from the client apparatus;

transmitting a print completion notification to the client apparatus in response to completion of the print process for the print request by the image forming apparatus, wherein, when the client apparatus repeatedly makes an inquiry about a processing situation of the executed print request, transmitting a message indicating that the print process is under processing to the client apparatus, until it is confirmed that the image forming apparatus has completed the print process for the print request; and instructing the client apparatus to stop the repeated inquiry when the print completion notification is transmitted to the client apparatus.

4. The method according to claim 3, further comprising deleting data obtained from the executed print service after the process corresponding to the print request is completed in the executed print service.

5. A non-transitory computer-readable storage medium on which is stored computer executable code of a computer program that, when executed by a computer, causes the computer to execute the method according to claim 3.

* * * * *